(12) United States Patent
Fredriksson et al.

(10) Patent No.: US 11,895,450 B2
(45) Date of Patent: Feb. 6, 2024

(54) SHELF WITH LOUDSPEAKER

(71) Applicant: IKEA Supply AG, Pratteln (CH)

(72) Inventors: Andreas Fredriksson, Lund (SE); Mikael Warnhammar, Vastra Frolunda (SE); David Zeberg, Almult (SE)

(73) Assignee: IKEA Supply AG, Pratteln (CH)

( * ) Notice: Subject to any disclaimer, the term of this patent is extended or adjusted under 35 U.S.C. 154(b) by 0 days.

(21) Appl. No.: 17/059,676

(22) PCT Filed: Apr. 5, 2019

(86) PCT No.: PCT/SE2019/050313
§ 371 (c)(1),
(2) Date: Nov. 30, 2020

(87) PCT Pub. No.: WO2019/231369
PCT Pub. Date: Dec. 5, 2019

(65) Prior Publication Data
US 2021/0211791 A1   Jul. 8, 2021

(30) Foreign Application Priority Data
Jun. 1, 2018   (SE) .................................. 1850668-3

(51) Int. Cl.
*H04R 1/02*   (2006.01)
*A47B 95/00*   (2006.01)

(52) U.S. Cl.
CPC ........... *H04R 1/026* (2013.01); *A47B 95/008* (2013.01); *H04R 2201/021* (2013.01); *H04R 2420/07* (2013.01)

(58) Field of Classification Search
CPC .............. H04R 1/026; H04R 2201/021; H04R 2420/07; H04R 5/02; A47B 95/008; A47B 81/06; A47B 23/04; F16M 13/02
See application file for complete search history.

(56) References Cited

U.S. PATENT DOCUMENTS

| 2,693,400 A | 11/1954 | Erickson |
| 2,959,297 A | 11/1960 | Larson |
| 4,673,057 A | 6/1987 | Glassco |

(Continued)

FOREIGN PATENT DOCUMENTS

| CN | 1697558 A | 11/2005 |
| CN | 101841751 A | 9/2010 |

(Continued)

OTHER PUBLICATIONS

Mar. 27, 2011 https://www.youtube.com/watch?v=cVtpp-c6CLc; whole document, Mar. 27, 2011.

(Continued)

*Primary Examiner* — Andrew L Sniezek
(74) *Attorney, Agent, or Firm* — Capitol City TechLaw

(57) ABSTRACT

A wall-mounted shelf attachable to a vertical surface (14), the wall-mounted shelf (1) including a shelf body (1') including a flat top shelf surface (10a) and a loudspeaker (2) including at least one loudspeaker element (12) and being arranged below the top shelf surface (10a). The wall-mounted shelf (1) further includes a mounting assembly (3), wherein the mounting assembly (3) includes a bracket (3) attachable to the vertical surface (14) and having a connection (5) for connecting the bracket (3) to the shelf body (1').

21 Claims, 9 Drawing Sheets

(56) References Cited

U.S. PATENT DOCUMENTS

| | | | | |
|---|---|---|---|---|
| 6,056,083 | A * | 5/2000 | Daniell | H04R 5/02 |
| | | | | 181/144 |
| 7,164,576 | B2 | 1/2007 | Suprapmo et al. | |
| 9,532,122 | B1 | 12/2016 | Harris | |
| 9,845,578 | B2 | 12/2017 | Marsolek et al. | |
| 2004/0245421 | A1 * | 12/2004 | Turvey | A47B 96/061 |
| | | | | 248/304 |
| 2005/0045777 | A1 | 3/2005 | Lee et al. | |
| 2010/0006735 | A1 | 1/2010 | Reinen | |
| 2011/0110540 | A1 | 5/2011 | Mispelkamp | |
| 2012/0235001 | A1 | 9/2012 | Soumuah | |
| 2016/0100685 | A1 * | 4/2016 | Tibbe | A47B 96/061 |
| | | | | 248/220.22 |
| 2016/0372843 | A1 * | 12/2016 | Chen | H01R 25/145 |

FOREIGN PATENT DOCUMENTS

| | | |
|---|---|---|
| CN | 107925802 A | 4/2018 |
| CN | 207421711 U | 5/2018 |
| CN | 207443066 U | 6/2018 |
| JP | 2000106964 A | 4/2000 |
| JP | 2001333822 A | 12/2001 |
| JP | 2005124608 A | 5/2005 |
| JP | 2008263558 A | 10/2008 |
| JP | 2009000169 A | 1/2009 |
| WO | 2009/046715 A1 | 4/2009 |

OTHER PUBLICATIONS

May 3, 2014 https://www.youtube.com/watch?v=1Os90RCsWfM; whole document, May 3, 2014.
Lack, Inter IKEA Systems B.V. (2001) Mar. 5, 2018, whole document.
International Search Report for International Application No. PCT/SE2019/050313 dated Jul. 8, 2019 (6 pages).
Extended European Search Report for EP Application No. 19810944.9 dated Feb. 4, 2022 (17 pages).
Duraline Shelving: "How To: Duraline zwevende wandplank/XL-paneel monteren—Nederlands", Nov. 7, 2012, XP055883190, Retrieved from the Internet: URL:https://www.youtube.com/watch?V=rphNks7Adv4.
Chinese Office Action for CN Application No. 201980035886 dated Jun. 6, 2022 (23 pages, with English translation).

* cited by examiner

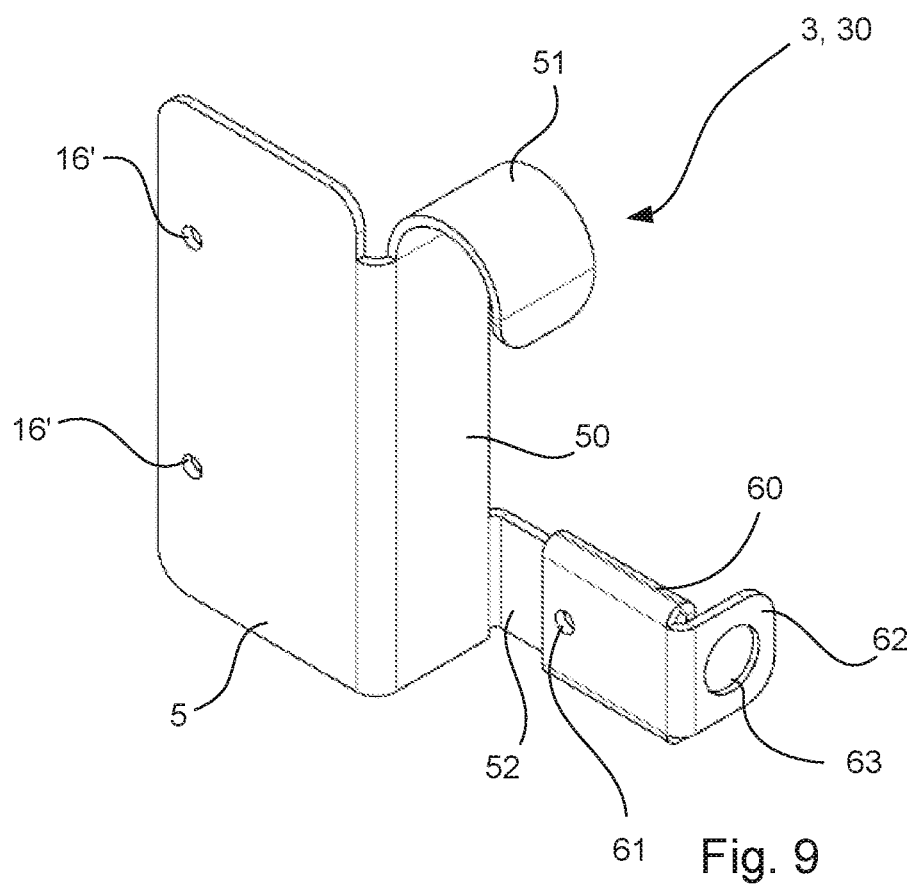

SHELF WITH LOUDSPEAKER

This application is a National Stage Application of PCT/SE2019/050313, filed 5 Apr. 2019, which claims benefit of Serial No. 1850668-3, filed 1 Jun. 2018, in Sweden and which applications are incorporated herein by reference. To the extent appropriate, a claim of priority is made to each of the above disclosed applications.

TECHNICAL FIELD

The present invention relates to a wall-mounted shelf, and a method for mounting said wall-mounted shelf.

BACKGROUND

Conventional wall-mounted shelves usually comprise a top surface for holding objects, mounting means for mounting the wall-mounted shelf to a wall, and support means for supporting the weight of the objects held on the top surface. These support means usually take up a lot of wall space below the shelf which could be used for other things.

In the modern homes of today, space is a precious commodity and efficient, multi-use storage is desirable. There is thus a need for a wall-mounted shelf with more efficient use of the volume below the top surface.

SUMMARY

An object is therefore to provide a wall-mounted shelf which solves the drawbacks of the prior art.

In accordance with a first aspect, a wall-mounted shelf is provided. The wall-mounted shelf is attachable to a vertical surface, the wall-mounted shelf comprising a shelf body having a flat top shelf surface, a front surface extending at an angle from the flat top shelf surface and facing away from the vertical surface, and a loudspeaker comprising at least one loudspeaker element and being arranged below the top shelf surface, the at least one loudspeaker element being arranged for facing away from the vertical surface whereby generated sound is directed out from said front surface. The wall-mounted shelf further comprises mounting means, wherein the mounting means comprise at least one bracket attachable to the vertical surface and having connection means for connecting the bracket to the shelf body. A wall-mounted shelf configured accordingly will efficiently use the volume below the top surface, as well as provide additional functionality and usability. The shelf may be used for storing books, souvenirs and other objects that users normally store on wall-mounted shelves.

The flat top shelf surface may form one side of a casing of the loudspeaker, said casing holding said loudspeaker element. This saves material as the flat top shelf surface has the additional function of also forming a part of a casing holding the loudspeaker element.

The flat top shelf surface may be planar and homogenous, which is advantageous in that the entire flat top shelf surface can be used for storing objects.

The loudspeaker may comprise one or more loudspeaker elements, wherein loudspeaker element is arranged for facing away from the vertical surface, and whereby generated sound is directed out from said front surface only.

The connection means of the bracket may comprise at least two prongs arranged to extend perpendicularly from the vertical surface and connect to prong connectors of the shelf body. This provides for easy mounting of the wall-mounted shelf to a vertical surface, e.g. to a wall. Preferably the two prongs are formed as flat metal sheets.

The at least two prongs may be arranged to be completely hidden inside the shelf body when the at least two prongs are connected to the prong connectors. Thereby a very space efficient arrangement is achieved, with minimum risk of unintended human contact with the prongs.

The prong connectors may be arranged in a casing holding said at least one loudspeaker element. Thereby the prong connectors may be invisible and prongs may be invisible when the shelf body has been mounted to the bracket.

The fastening means attaching the at least two prongs to the shelf body may be inserted perpendicular to the at least two prongs. This increases stability and simplifies construction.

The at least two prongs of the mounting means may be insertable into the back of the shelf body near the sides of the wall-mounted shelf and the fastening means may be inserted perpendicular to the at least two prongs using holes in the sides of the shelf body. This is stable and easy to assemble.

The top surface may be substantially oblong and more wide than it is deep, the width being seen along the vertical surface and the depth being seen perpendicularly to the vertical surface. This creates a large top shelf surface for putting objects on while still maintaining the structural integrity of the shelf.

The wall-mounted shelf may further comprise wireless communication means for controlling the output of the loudspeaker wirelessly. This allows for wireless control of the loudspeaker, including for example sending music to the loudspeaker from a smartphone or another music device.

The wall-mounted shelf may further comprise a control panel for controlling the output of the loudspeaker. This allows for simple and intuitive control of the loudspeaker.

The control panel may further comprise light indicators. This allows for feedback to a user.

The back plate of the mounting means may cover most of the back of the shelf body. This provides stability and protection.

The back plate of the mounting means may have an extension in the plane of the back of the shelf body that is equal to or smaller than the extension of the back of the shelf body, such that when the shelf body has been mounted to the mounting means the back plate will be hidden behind the shelf body. This is a very space efficient arrangement and also reduces the risk of unintentional contact with the mounting means.

A central portion of the back of the shelf body may be countersunk into the shelf body, whereby a peripheral rim is formed at the outer edge of the back, wherein, in the mounted state, a back plate of the mounting means may be received in the countersunk central portion of the back. Preferably, the peripheral rim will come into contact with the vertical surface and will completely hide the mounting means. Thereby the mounting means may be fully hidden inside the shelf body which saves space, is aesthetically pleasing and reduces unintended access to the mounting means.

The back of the shelf body may have an opening for guiding electrical cords downwards behind the back plate of the mounting means. This is aesthetically pleasing and allows for the cords to be easily managed.

The back of the shelf body may comprise at least two prong connectors in the form of slits for receiving the connection means having the form of least two prongs extending from the bracket and arranged for extending into the slits. This simplifies assembly and also provides for a smooth outer surface as the prongs are concealed inside the slits.

The mounting means may comprise at least one bracket having a hook being attachable to a rail mounted to the vertical surface. This allows for additional possibilities to attach the shelf to a vertical surface, via a rail. Preferably the mounting means comprises two hooks being attachable to the rail. This increases the stability of the mounting of the shelf. Preferably the mounting means comprising two brackets each having a hook. Still more preferably the two brackets are arranged to be connected at horizontally opposite sides of the shelf body.

The at least one bracket may comprise an adjustable abutment arrangement arranged to abut against the vertical surface and be adjustable to set the angle of the flat top shelf surface. Preferably said abutment arrangement being arranged in a vertically opposite end of the bracket in relation to said hook. Still more preferably said abutment arrangement being arranged below said hook. Preferably said adjustable abutment arrangement comprises an adjustable plate which is arranged to be slid in a horizontal direction in relation to the hook and which can be reversibly locked to the bracket in a desired position.

According to a second aspect, a method for mounting a wall-mounted shelf according to the first aspect is provided. The method comprises the steps of attaching the mounting means to the vertical surface; mounting the shelf body to the mounting means by connecting the connection means to the back of the shelf body; and fastening the connection means to the shelf body using fastening means. This is very intuitive and easy to assemble.

According to a third aspect, a wall-mounted shelf attachable to a vertical surface is provided. The wall-mounted shelf comprises a shelf body comprising a flat top shelf surface, and a loudspeaker comprising at least one loudspeaker element; the wall-mounted shelf further comprising mounting means, wherein the mounting means comprise at least one bracket being attachable to the vertical surface, and having connection means for connecting the bracket to the shelf body, the at least one bracket comprising at least one hook being attachable to a rail mounted to the vertical surface.

BRIEF DESCRIPTION OF THE DRAWINGS

In the following description reference will be made to the appended drawings, in which:

FIG. 9 is an isometric view of a mounting means for the shelf 1 shown in FIGS. 8*a-b*.

DETAILED DESCRIPTION

Figure 1:
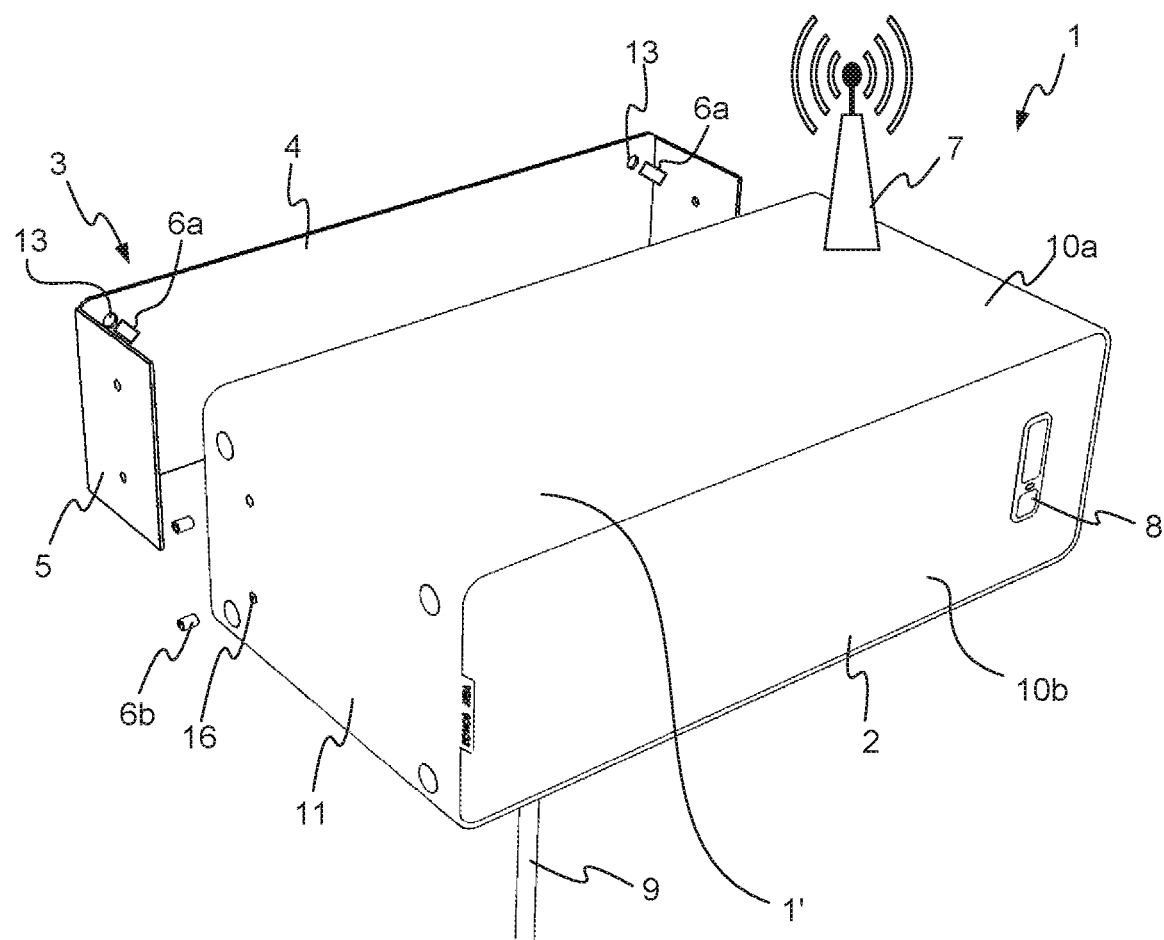
FIG. 1 shows an isometric front view of a wall-mounted shelf according to an embodiment.

The embodiments described in the following relate to a wall-mounted shelf 1. Starting in FIG. 1, an isometric front view of a wall-mounted shelf 1 according to an embodiment is shown. The wall-mounted shelf 1 is attachable to a vertical surface 14, such as a wall (not shown in FIG. 1, but schematically indicated in FIG. 6). The wall mounted shelf 1 comprises a shelf body 1'. The shelf body 1' comprises a flat top shelf surface 10*a* which is substantially oblong and preferably more wide than it is deep. In the figures the top surface 10*a* is rectangular and has rounded edges, but the top surface 10*a* may be of any shape, and in some embodiments it may be provided with sharp edges and/or corners. Preferably, the top surface 10*a* is planar and homogenous, having no major irregularities like holes or other structural features, such that the entire top surface 10*a* can be used as a shelf to support objects.

The shelf body 1' further comprises a loudspeaker 2 comprising at least one loudspeaker element 12 (see FIG. 3) and being arranged below the top surface 10*a* and facing away from the vertical surface 14. The shelf 1 has a front surface 10*b* that extends from the top surface 10*a* at an angle, in this embodiments substantially 90°. The loudspeaker 2 occupies most of the interior volume of the shelf body 1' and may be encased by a casing or fastened or hung directly below the top surface 10*a*. The flat top shelf surface 10*a* may form one side of a casing 11 of the loudspeaker 2, said casing 11 holding said loudspeaker element 12. The loudspeaker 2 serves several purposes. It gives structural stability to the shelf 1, as the loudspeaker 2 is preferably made from sturdy material such as hard plastic, wood, fiber board, or metal. It uses the space below the top surface 10*a* well by adding functionality in the form of a loudspeaker 2. Wall-mounted loudspeakers 2 may already exist in the prior art, but they are difficult to mount and do not function well as shelves 1. Furthermore, while most loudspeakers 2 are possible to wall-mount, loudspeakers 2 are typically adapted for a specific height or surrounding environment which reduces their functionality when wall-mounted. The loudspeaker 2 may e.g. be an active loudspeaker, meaning that it includes amplifiers and power electronics to drive the loudspeaker.

The wall-mounted shelf 1 is mounted to the wall 14 using mounting means 3. In the shown embodiment the mounting means 3 comprises an elongated U-shaped bracket with a back plate 4 and at least two prongs/legs 5. The mounting means 3 are arranged between the vertical wall surface 14 and the shelf body 1', located behind the shelf body 1' on the opposite side of the loudspeaker 2 output. The back plate 4 covers the back 17 of the shelf body 1' and is attachable to the vertical surface 14 using fastening means 6*a*, such as screws, adhesives, bolts, nails, plugs or equivalent extending through the wall-mounting holes 13. The at least two prongs 5 are preferably arranged near the sides of the wall-mounted shelf 1 and extend into the back 17 of the shelf body 1'. The at least two prongs 5 are then attachable to the shelf body 1' using fastening means 6*b* inserted perpendicularly to the at least two prongs 5, for example using holes 16 in the sides of the shelf body 1'.

The wall-mounted shelf 1 further comprises wireless communication means 7. The wireless communication means 7 may be arranged as an antenna extending from the top surface 10*a* of the shelf 1 as in FIG. 1, however it is more preferable to arrange the wireless communication means 7, such as an antenna, inside the shelf body 1' so as to not reduce the capability of the top surface 10*a* for holding objects. Examples of wireless communication standards include Bluetooth, Bluetooth Low Energy (BLE), near-field communication (NFC), radio frequency identification (RFID), LTE and Wi-Fi; but other wireless communications are of course also possible within the scope of the present invention. By using the wireless communication means 7, a user may connect to the loudspeaker 2 to control its output wirelessly. This may include changing the volume, changing a song in a playlist, turning the loudspeaker 2 on or off or any other method of control known to the skilled person. One example of a user interface for such control is an app on a smartphone connected to the wireless communication means 7, however other user interfaces are known in the art.

The wall-mounted shelf 1 further comprises a control panel 8, preferably arranged on the front face or surface 10*b* of the shelf body 1', facing away from the vertical surface 14. The control panel 8 may be arranged on the loudspeaker 2 itself or adjacent to it on a casing. The control panel 8 may comprise a user interface such as a touch display or one or more buttons, which may be actuators or capacitive. The interface may allow for control of volume and skipping songs in a playlist using different buttons or different inputs for the same buttons such as long-presses and short-presses or it may only allow for on/off control. If the shelf 1 comprises wireless communication means 7, the control panel 8 preferably has an input for connecting to another device wirelessly.

The control panel 8 may further comprise light indicators. These may be light emitting diodes (LEDs) arranged to be able to produce differently coloured light. These may serve as user feedback, for example emitting green light when the loudspeaker 2 is on and red light when the loudspeaker 2 is off. The coloured lights may also serve as a sort of synesthesia show to the beat of music playing through the loudspeaker 2.

Figure 2:
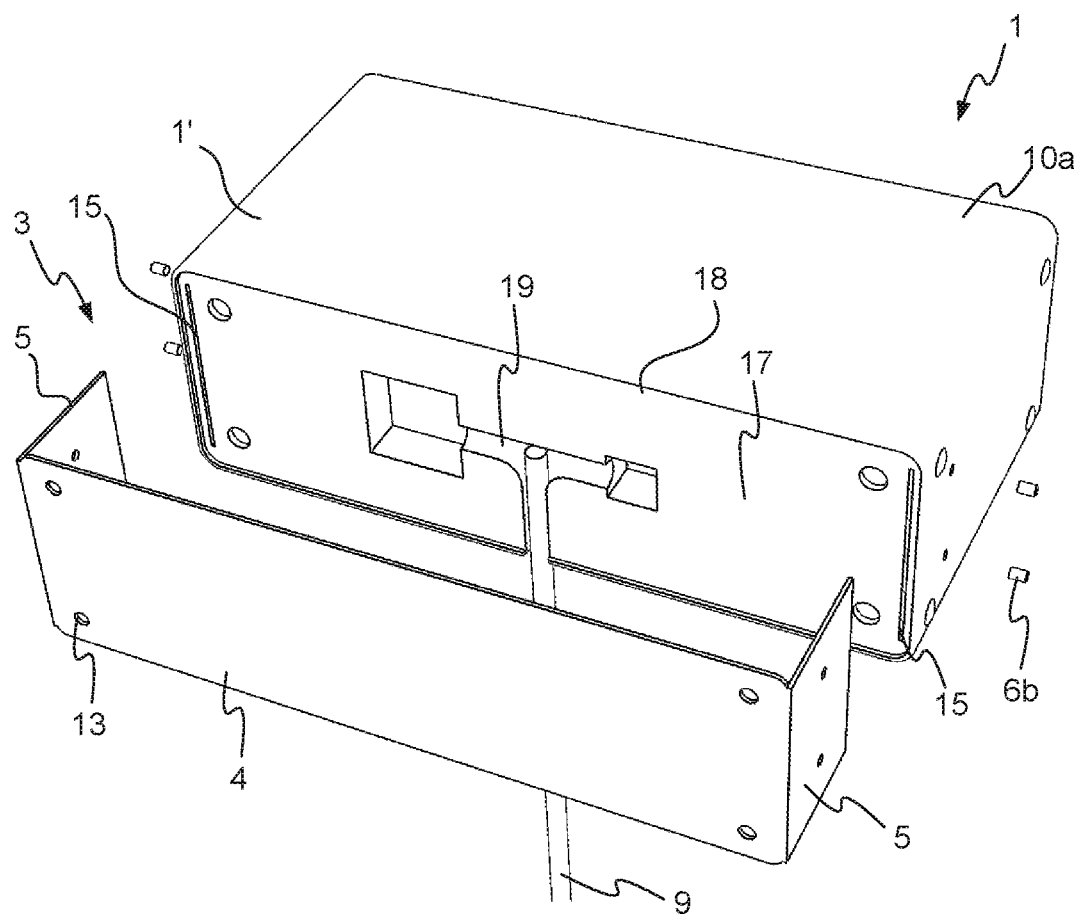
FIG. 2 shows an isometric back view of a wall-mounted shelf according to an embodiment.

In FIG. 2 an isometric back view of a wall-mounted shelf 1 according to an embodiment is shown. The back 17 of the shelf body 1' has an opening 19 for guiding electrical cords 9, such as cords providing electric power to the loudspeaker 2, downwards in front of the back plate 4 of the mounting means 3. This is aesthetically pleasing and allows for the cords 9 to be easily managed. The electrical cords 9 may be guided individually or collected e.g. in a tube. The opening 19 may extend through the bottom of the shelf body 1' as seen in FIG. 2. In an alternative embodiment the loudspeaker 2 may be powered by an internal battery.

Different inputs for the loudspeaker 2, such as a power cable input, are preferably arranged at the back 17 of the shelf body 1'. This is aesthetically pleasing and allows for the electrical cords 9 to be easily managed. The opening 19 preferably extends around the different inputs to allow for easy access.

The back 17 of the shelf body 1' comprises at least two prong connectors 15 which in this embodiment has the shape of slits for receiving the at least two prongs or legs 5 of the mounting means 3. There may be two, three, four or more slits 15 and the number of prongs 5 is preferably evenly divisible by the number of slits 15, and even more preferably the number of slits 15 is equal to the number of prongs 5. The slits 15 are oblong and vertical in this embodiment, but may take any form. However, the shape should preferably match the shape of the at least two prongs 5, at least in the preferred embodiment where the number of slits 15 is equal to the number of prongs 5. This simplifies assembly in a number of ways. Firstly, by giving the at least two slits 15 a unique shape compared to other openings on the back 17 of the shelf body 1' the at least two prongs 5 are only insertable into the at least two slits 15, leading to a foolproof assembly. Secondly, the at least two prongs 5 may, once inserted into the at least two slits 15, have an interplay that allows for the shelf body 1' to be supported on the mounting means 3 until the at least two prongs 5 are attached to the shelf body 1' in a future assembly step. By providing the at least two prong connectors 15 as vertically elongated slits, being very thin (i.e. in the range of 0.5-3 mm), a number of advantages are obtained. For the shelf body 1', the thin prong connectors 15 will steal only a very little volume from the loudspeaker 2, thereby improving sound quality. Further, the prong connectors 15 provided as vertically elongated slits allows the use of a mating connection means in the form of a bent or folded metal sheet so that the prongs 5 that go into the shelf body 1' are thin and very close to the outer edge, still being able to carry the required load. This results in a more compact and lightweight solution, but also a lower cost than if other techniques, such as welding, were used.

The connection means 5 and/or the prong connectors 15 may optionally comprise silencing means, such as vibration dampening means, such as foam or rubber in order to sound-proof the shelf body 1' from the vertical surface 14. The silencing means may be arranged as a cushion or a gasket, however other arrangements are possible within the scope of the appended claims. Sound-proofing has the added benefit that sound vibrations may cause the connection between the shelf body 1' and the vertical surface 14 to deteriorate.

Figure 3:
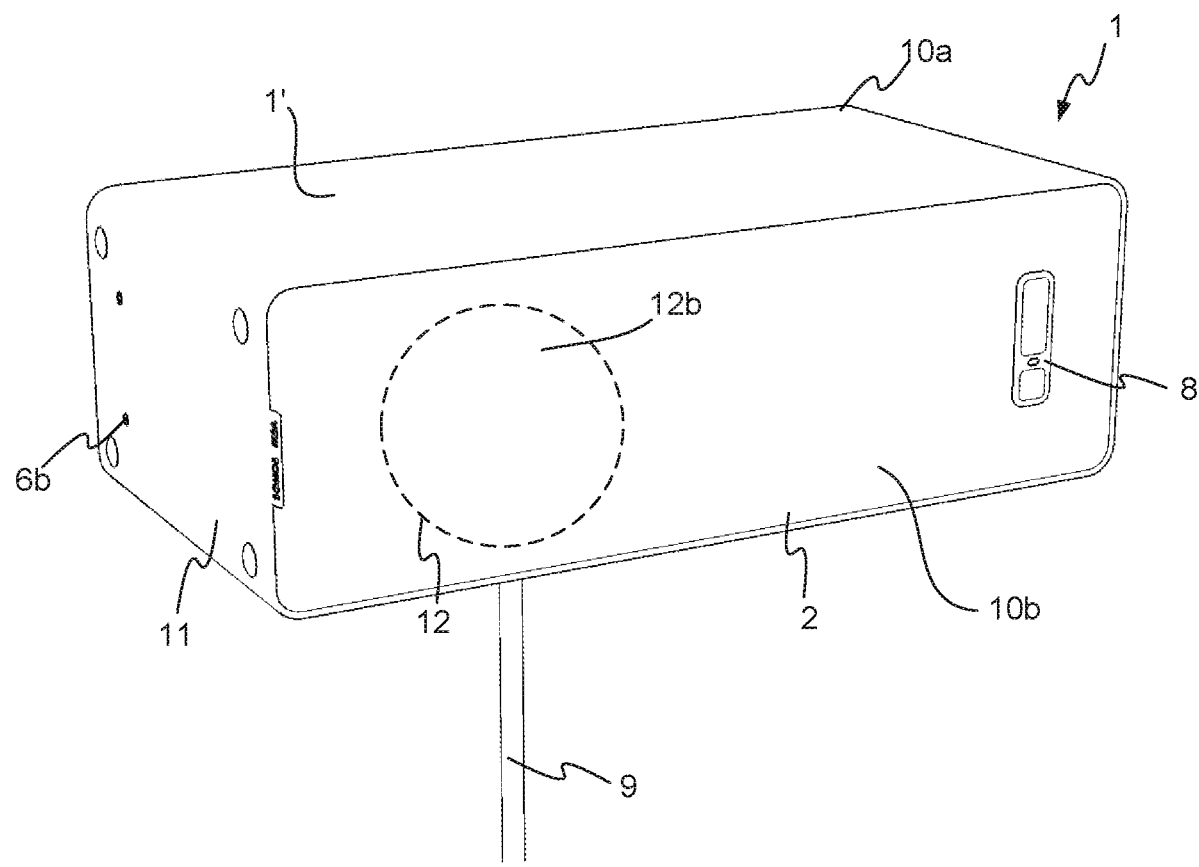
FIG. 3 shows an isometric front view of a mounted wall-mounted shelf according to an embodiment.

FIG. 3 shows an isometric front view of a mounted wall-mounted shelf 1 according to an embodiment. The at least two prongs 5 are secured to the shelf body 1' using the fastening means 6*b*. As the two prongs 5 are received in the slits 15 shown in FIG. 2 the prongs 5 are hidden inside the shelf body 1' in the perspective illustrated in FIG. 3. In order to unmount the wall-mounted shelf 1, a user simply removes the fastening means 6*b* and pulls the shelf body 1' off of the mounting means 3.

As can be seen in FIG. 3 the front surface 10*b* is provided with one or more ports 12*b*. The port 12*b* is aligned with one or more loudspeaker elements 12. Preferably, if the wall-mounted shelf 1 is provided with several loudspeaker elements 12, the one or more respective ports 12*b* are arranged on the front surface 10*b* only. Having the ports 12*b* pointing forward allows for a more versatile placement without compromising sound porting, for example it is possible to mount the shelf 1 to the wall under a kitchen cabinet. Further, by having the ports 12*b* directed forward only, the vibrations on the top surface 10*a* will be reduced, which will prevent objects from walking off the shelf 1 when playing.

Figure 4:
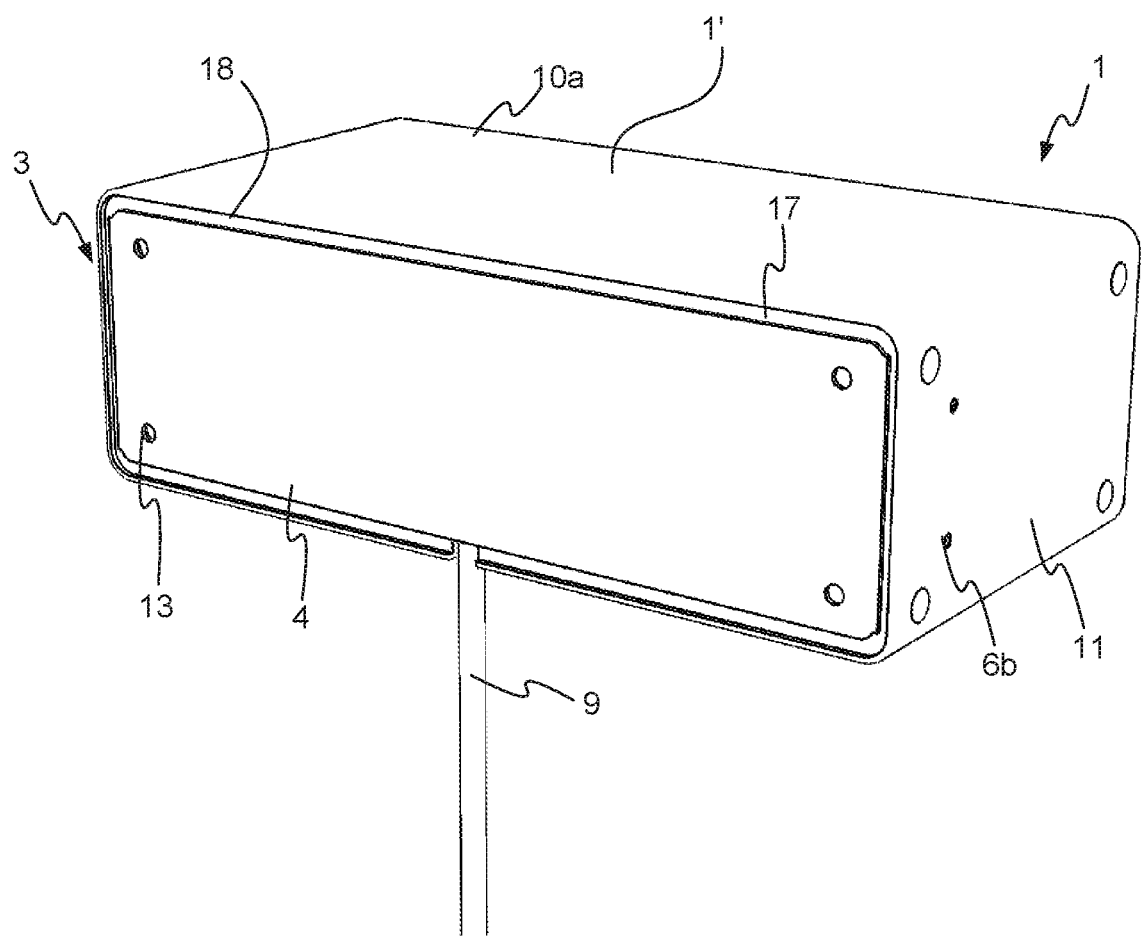
FIG. 4 shows an isometric back view of a mounted wall-mounted shelf according to an embodiment.

FIG. 4 shows an isometric back view of a mounted wall-mounted shelf 1 according to an embodiment. The vertical surface 14 (not shown) is attached directly to the back plate 4 of the mounting means 3 using fastening means 6*a* (see FIG. 1) extending through the wall-mounting holes 13. The back plate 4 covers most of the back 17 of the shelf body 1'. This gives stability and protection. The back plate 4 has an extension in the plane of the back 17 of the shelf body 1' that is equal to or smaller than the extension of the back 17. Hence, in the mounted state shown in FIG. 3 and FIG. 4 the back plate 4 is hidden behind the shelf body 1'. Once the mounting means 3 are fully inserted into the shelf body 1', the back 17 of the shelf body 1' preferably lies flush to the vertical surface 14. This is accomplished by a central portion of the back 17 being countersunk into the shelf body 1', whereby a peripheral rim is formed at the outer edge of the back 17. In the mounted state the back plate 4 is fully received in the countersunk central portion of the back 17, and the peripheral rim will come into contact with the vertical surface 14 and will completely hide the mounting means 3, also from a side view.

Figure 5:
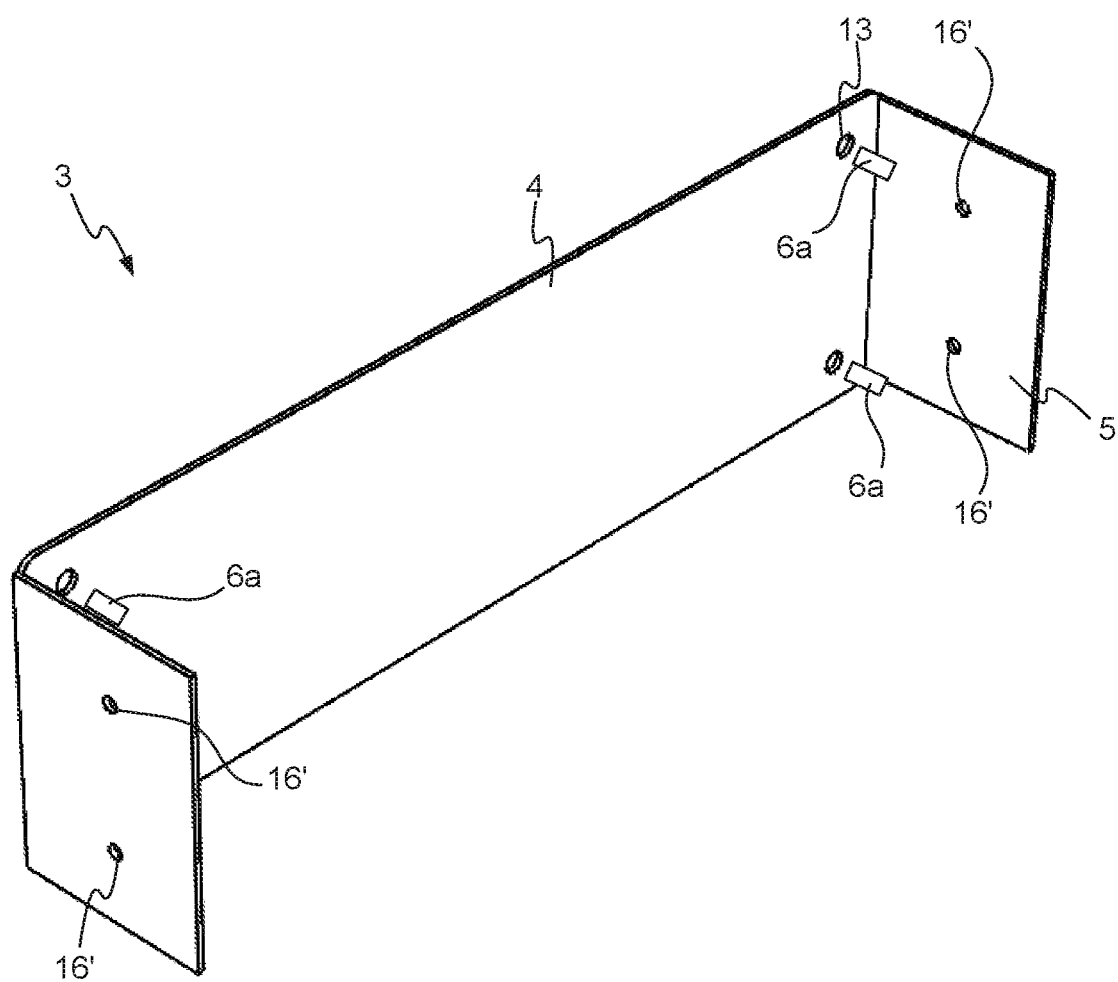
FIG. 5 shows an isometric front view of a mounting means according to an embodiment.

FIG. 5 shows an isometric front view of a mounting means 3 according to an embodiment. The back plate 4 has four wall-mounting holes 13, one in each corner, though other configurations and numbers of holes 13 are of course possible. Each hole 13 is intended to receive a fastening means 6a, for example a screw. The fastening means 6a then hold the mounting means 3 to the vertical surface, for example by the head of the screw being wider than the holes 13.

The at least two prongs 5 each have two holes 16'. The two, three, four or more prongs 5 may also have more or less than two holes 16'. Each prong hole 16' is paired with a hole 16 in the side of the shelf body 1' that align with the holes 16' in the at least two prongs 5 once the at least two prongs 5 are fully inserted into the at least two slits 15 in the back 17 of the shelf body 1'. The fastening means 6b (FIG. 1), which in this case may be bolts, are then inserted into these aligned holes 16, 16', preventing them from misaligning from each other, thereby fastening the at least two prongs 5, and in turn fastening the mounting means 3, to the shelf body 1'.

Figure 6:
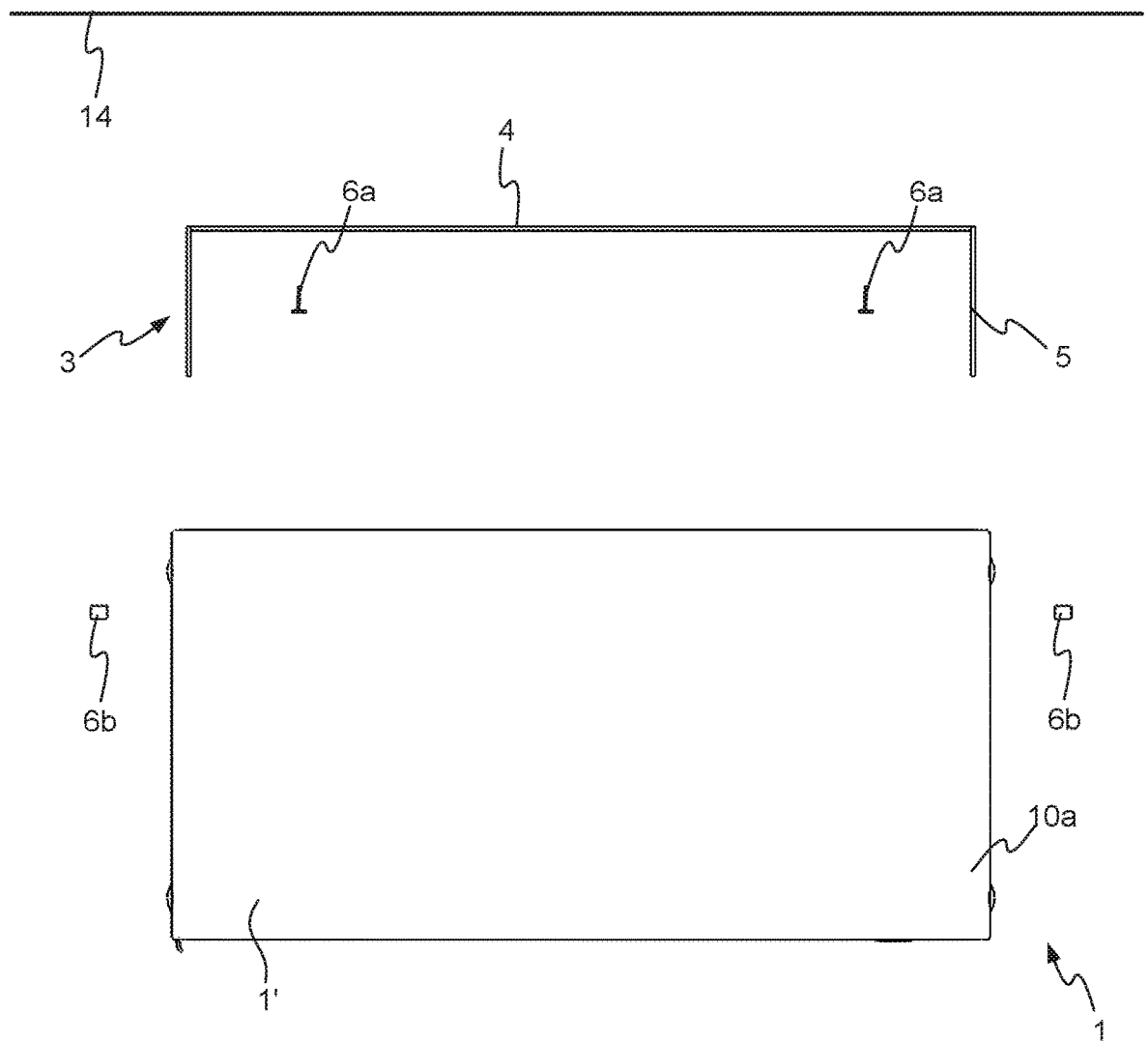
FIG. 6 shows top view of a wall-mounted shelf according to an embodiment.

In FIG. 6 a top view, looking vertically downwards along a vertical surface 14, such as a wall of a living room, of a wall-mounted shelf 1 according to an embodiment is shown. In order to mount the shelf 1 to the vertical surface 14 using the mounting means 3 starting from the situation in FIG. 6, first the back plate 4 of the mounting means 3 is attached to the vertical surface 14 (which is shown at the top of FIG. 6) by using fastening means 6a, such as screws.

Next, the shelf body 1' is mounted to the mounting means 3 by inserting the at least two prongs 5 into the at least two slits 15 in the back 17 of the shelf body 1', by moving the shelf body 1' upwards in the figure.

Finally, the at least two prongs 5 are fastened to the shelf body 1 'by using the fastening means 6b perpendicular to the at least two prongs 5. In this embodiment, the at least two prongs 5 and the sides of the shelf body 1' have holes 16, 16' that are aligned once the at least two prongs 5 are fully inserted into the at least two slits 15 in the back 17 of the shelf body 1'. The fastening means 6b, which in this case may be plugs, are then inserted into these aligned holes 16, 16', preventing them from misaligning from each other, thereby fastening the at least two prongs 5, and in turn fastening the mounting means 3, to the shelf body 1'.

Figure 7:
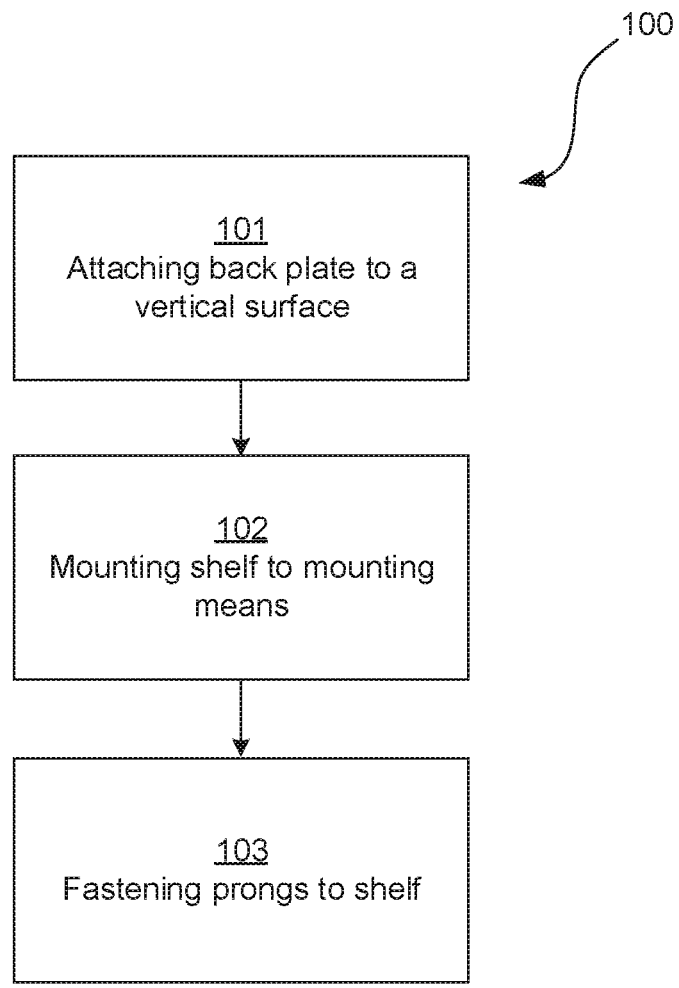
FIG. 7 shows a flowchart of a method for mounting a wall-mounted shelf according to an embodiment.

In FIG. 7 a flowchart of a method 100 for mounting a wall-mounted shelf according to an embodiment is shown. The method comprises the steps of first attaching 101 the back plate 4 of the mounting means 3 to the vertical surface 14. Next, mounting 102 the shelf body 1' to the mounting means 3 by inserting the at least two prongs 5 into the back 17 of the shelf body 1'. Finally, fastening 103 the at least two prongs 5 to the shelf body 1' by using fastening means 6b. Other steps are also possible before, after or between the steps mentioned.

So far, the embodiments are directed to a bracket 3 having connecting means 5 in the form of spaced-apart prongs, and the bracket 3 being arranged to be mounted by, e.g., being directly screwed to a wall 14. In the following, another embodiment of a wall-mounted shelf 1 will be described.

Figure 8A:
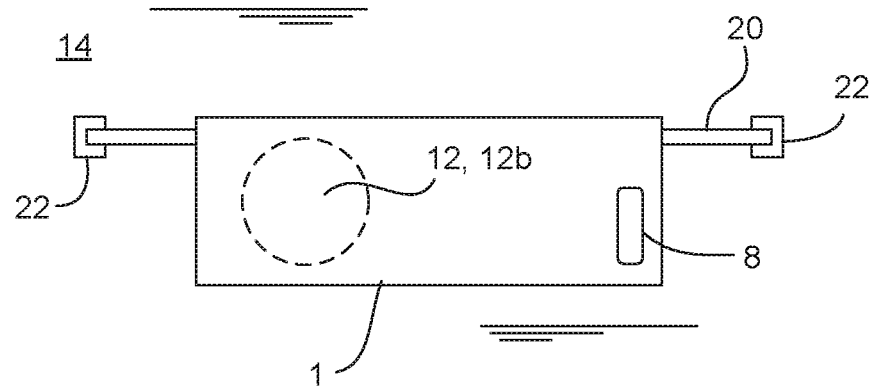
FIG. 8*a* is a front view of a wall-mounted shelf according to an embodiment.
Figure 8B:
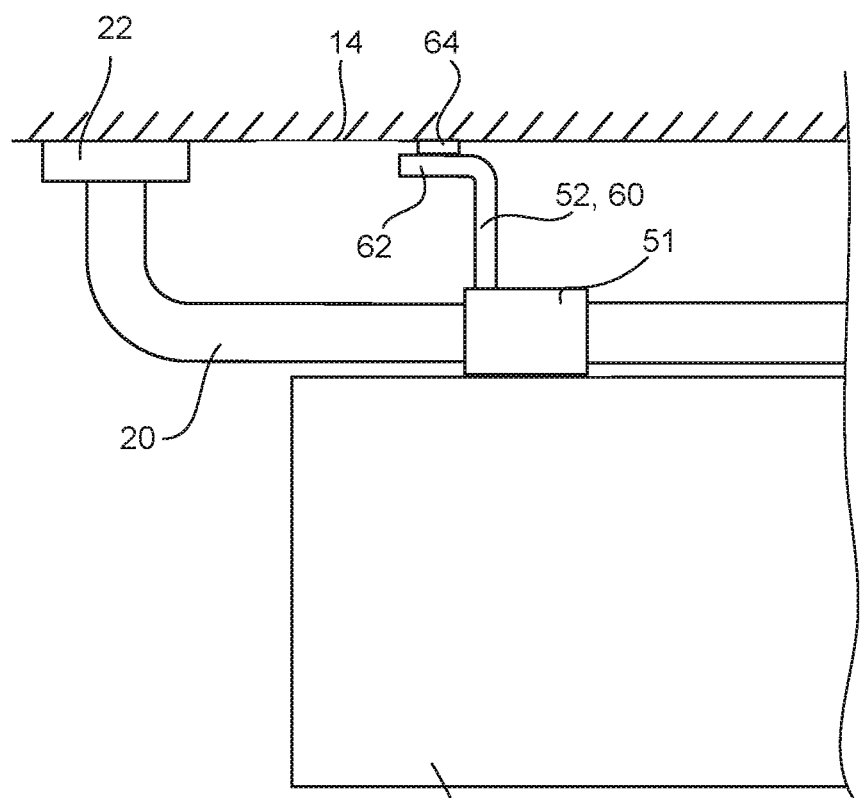
FIG. 8*b* is a top view of parts of the wall-mounted shelf shown in FIG. 8*a*.

In FIG. 8a, a front view of the shelf 1 is shown. For facilitating understanding of this embodiment, a top view of parts of the wall-mounted shelf 1 is shown in FIG. 8b. The shelf 1 is similar to the previously described shelf 1, having one or more loudspeaker elements 12 pointing forward through one or more ports 12b, optionally a control panel 8, etc. Instead of being screwed to the wall 14 by means of the bracket 3, the shelf 1 is in this embodiment hung to a rail 20. The rail 20 is preferably horizontally arranged, and attached to the wall 14 by means of one or more wall connectors 22. The rail 20 is configured as a rod, arranged at a certain distance from the wall 14. The rail 20 could be arranged in, e.g., a kitchen with the purpose of hanging various kitchen utensils to it.

In FIG. 9 mounting means to be used in the embodiment of FIGS. 8a-b are shown. Some details of the mounting means are also visible in FIG. 8b. The mounting means 3 may comprise one or more brackets 30. According to one preferred embodiment the mounting means comprises two brackets 30. Each bracket 30 has a prong 5, being similar to the prongs 5 previously explained. Hence, the prong 5 is extending vertically and configured to fit in a very narrow slit of the shelf 1. The prong 5 is provided with holes 16' to receive fastening means, such as screws, such that the bracket 30 can be secured to the shelf 1. The respective prong 5 of two parallel brackets 30 could be inserted into respective prong connectors 15 of the type illustrated hereinbefore with reference to FIG. 2. Hence, two brackets 30 could be used together with a shelf body 1' of the type illustrated in FIGS. 1 and 2 and would thereby replace the bracket 3 illustrated in FIG. 5. Returning to FIG. 9, the bracket 30 is formed by a folded metal sheet, such that the prong 5 extends to a perpendicular support surface 50. The support surface 50 is thereby configured to be arranged in contact with the rear surface of the shelf 1. The upper part of the support surface 50 is provided with a hook 51, to be hung on the rail 20. The bottom part of the support surface 50 is provided with a connecting surface 52, extending perpendicular to the support surface 50 and in parallel with the prong 5. The connecting surface 52 is configured to be connected to an adjustable plate 60. The adjustable plate 60 is slid onto the connecting surface 52, and can be locked in position by means of a screw (not shown) threaded into a hole 61 of the adjustable plate 60. An abutment arrangement in the form of a counter surface 62 is configured to rest against the wall 14, and has a seat 63 for mounting a rubber bumper 64 (see FIG. 8b). Depending on the horizontal distance between the rail 20 and the wall 14, the position of the adjustable plate 60 and its counter surface 62 relative the connecting surface 52 can be altered such that the angle of the shelf 1 is set accordingly. The shelf 1 is thereby attachable to the vertical surface wall 14, via the rail 20, by means of the prong(s) 5 acting as connection means for connecting the bracket 30 to the shelf body 1', and the hook 51 connecting the bracket 30 to the rail 20.

The description above thus discloses a wall-mounted shelf 1 which is improved in relation to the prior art. Although the present invention has been described above with reference to specific embodiments, it is not intended to be limited to the specific form set forth herein. Rather, the invention is limited only by the accompanying claims.

The invention claimed is:
1. A wall-mounted shelf attachable to a vertical surface, the wall-mounted shelf comprising:
 (a) a shelf body including
  a flat top shelf surface, a front surface extending at an angle from the flat top shelf surface and facing away from the vertical surface, a loudspeaker having at least one loudspeaker element and being arranged below the flat top shelf surface, the at least one loudspeaker element being arranged for facing away from the vertical surface whereby generated sound is directed out from the front surface, a back including two vertically elongated slits, and side surfaces;

(b) a bracket having a back plate being attachable to the vertical surface, and two prongs arranged at opposite sides of the back plate for connecting the bracket to the shelf body, the two prongs extending perpendicularly from the back plate and respectively insertable into the two vertically elongated slits in a direction perpendicular to the back plate the two prongs each being formed as a flat sheet; and (c) a fastener adapted to pass through at least one of the shelf body side surfaces and engage with at least one of the prongs to connect together the bracket and the shelf body.

2. The wall-mounted shelf according to claim 1, wherein the flat top shelf surface forms one side of a casing of the loudspeaker, the casing holding the loudspeaker element.

3. The wall-mounted shelf according to claim 2, wherein the two vertically elongated slits are arranged in the casing.

4. The wall-mounted shelf according to claim 1, wherein the flat top shelf surface is planar and homogenous.

5. The wall-mounted shelf according to claim 1, wherein each loudspeaker element is arranged for facing away from the vertical surface whereby generated sound is directed out from the front surface only.

6. The wall-mounted shelf according to claim 1, wherein the two prongs are formed as flat metal sheets.

7. The wall-mounted shelf according to claim 6, wherein the two prongs are arranged to be completely hidden inside the shelf body when the two prongs are inserted into the two vertically elongated slits.

8. The wall-mounted shelf according to claim 6, wherein a plurality of the fasteners are provided for attaching the two prongs to the shelf body, the fasteners being insertable perpendicular to the two prongs, wherein the two prongs and/or the two vertically elongated slits comprise silencing means.

9. The wall-mounted shelf according to claim 8, wherein the two prongs of the bracket are insertable into the back of the shelf body near the sides of the shelf body; and
wherein the fasteners are inserted perpendicular to the two prongs using holes in the side surfaces of the shelf body.

10. The wall-mounted shelf according to claim 1, wherein the flat top shelf surface is substantially oblong and more wide than it is deep, the width being seen along the vertical surface and the depth being seen perpendicularly to the vertical surface.

11. The wall-mounted shelf according to claim 1, further comprising wireless communication means for controlling an output of the loudspeaker wirelessly.

12. The wall-mounted shelf according to claim 1, further comprising a control panel for controlling an output of the loudspeaker.

13. The wall-mounted shelf according to claim 1, wherein the bracket is U-shaped;

wherein the back plate is intended to face the vertical surface and cover at least a part of the back of the shelf body; and wherein the back plate comprises mounting holes for mounting the back plate to the vertical surface.

14. The wall-mounted shelf according to claim 13, wherein the two prongs together with the back plate form the U-shape of the bracket.

15. The wall-mounted shelf according to claim 13, wherein the back plate of the bracket has an extension in a plane of the back of the shelf body that is equal to or smaller than an extension of the back of the shelf body;

wherein when the shelf body is mounted to the bracket the back plate will be hidden behind the shelf body.

16. The wall-mounted shelf according to claim 15, wherein a central portion of the back of the shelf body is countersunk into the shelf body, whereby a peripheral rim is formed at the outer edge of the back; and wherein, in a, mounted state, the back plate of the bracket is received in the countersunk central portion of the back.

17. The wall-mounted shelf according to claim 1, wherein the bracket has a hook being attachable to a rail mounted to the vertical surface.

18. The wall-mounted shelf according to claim 17, wherein the bracket comprises an adjustable abutment arrangement arranged to abut against the vertical surface and be adjustable to set the angle of the flat top shelf surface.

19. A method for mounting a wall-mounted shelf according to claim 1, the method comprising:

attaching the bracket to the vertical surface;

mounting the shelf body to the bracket by inserting the two prongs into the two vertically elongated slits provided in the back of the shelf body; and fastening the bracket to the shelf body using the fastener.

20. A wall-mounted shelf attachable to a vertical surface, the wall-mounted shelf comprising:

a shelf body including:
a flat top shelf surface, and
a loudspeaker having at least one loudspeaker element;

a bracket being attachable to the vertical surface, and having a prong for connecting the bracket to the shelf body, the bracket having a hook being attachable to a rail mounted to the vertical surface;

wherein a back of the shelf body includes a vertically elongated slit for receiving the prong, the prong extending from the bracket and insertable into the vertically elongated slit; and wherein the prong is formed as a flat sheet; and a fastener adapted to pass through a side surface of the shelf body and engage with the prong to connect together the bracket and the shelf body.

21. A wall-mounted shelf attachable to a vertical surface, the wall-mounted shelf comprising:

(a) a shelf body including
a flat top shelf surface,
a front surface extending at an angle from the flat top shelf surface and facing away from the vertical surface,
a loudspeaker having at least one loudspeaker element and being arranged below the flat top shelf surface, the at least one loudspeaker element being arranged for facing away from the vertical surface whereby generated sound is directed out from the front surface, and
a back including a vertically elongated slit;

(b) a bracket having a back plate being attachable to the vertical surface, and having a prong for connecting the bracket to the shelf body, the prong extending perpendicularly from the back plate and insertable into the vertically elongated slit in a direction perpendicular to the back plate, the prong being formed as a flat sheet; and a fastener adapted to pass through a side surface of the shelf body and engage with the prong to connect together the bracket and the self body.

\* \* \* \* \*